(12) United States Patent
Hoshino et al.

(10) Patent No.: US 10,407,307 B2
(45) Date of Patent: Sep. 10, 2019

(54) PRODUCTION PROCESS FOR SILICON CARBIDE

(71) Applicants: TAIZHOU BEYOND TECHNOLOGY CO., LTD, Zhejiang (CN); Masahiro Hoshino, Kawaguchi, Saitama (JP)

(72) Inventors: Masahiro Hoshino, Saitama (JP); Lenian Zhang, Zhejiang (CN)

(73) Assignee: Taizhou Beyond Technology Co., Ltd., Taizhou (CN)

( * ) Notice: Subject to any disclaimer, the term of this patent is extended or adjusted under 35 U.S.C. 154(b) by 197 days.

(21) Appl. No.: 15/123,657

(22) PCT Filed: Feb. 12, 2015

(86) PCT No.: PCT/CN2015/072942
§ 371 (c)(1),
(2) Date: Sep. 5, 2016

(87) PCT Pub. No.: WO2015/131755
PCT Pub. Date: Sep. 11, 2015

(65) Prior Publication Data
US 2017/0081198 A1    Mar. 23, 2017

(30) Foreign Application Priority Data

Mar. 6, 2014   (CN) .......................... 2014 1 0081038

(51) Int. Cl.
*B01J 19/08*   (2006.01)
*C01B 31/36*   (2006.01)
*C01B 32/956*  (2017.01)

(52) U.S. Cl.
CPC ............. *C01B 31/36* (2013.01); *B01J 19/088* (2013.01); *C01B 32/956* (2017.08);
(Continued)

(58) Field of Classification Search
None
See application file for complete search history.

(56) References Cited

U.S. PATENT DOCUMENTS

| 4,080,508 A | * | 3/1978 | Greenewald, Jr. .......................... C01B 21/0685 373/62 |
| 5,985,024 A | * | 11/1999 | Balakrishna ............ C30B 23/00 117/84 |

(Continued)

FOREIGN PATENT DOCUMENTS

| CN | 201310477645.X | 1/2014 |
| JP | S6077114 A | 5/1985 |
| WO | WO2009051888 A1 | 4/2009 |

OTHER PUBLICATIONS

Merriam-Webeter definition "raw material"; downloaded Feb. 19, 2019.*
International Search Report of PCT/CN2015/072942.

*Primary Examiner* — Guinever S Gregorio
(74) *Attorney, Agent, or Firm* — Minder Law Group; Willy H. Wong

(57) ABSTRACT

Inside a furnace body with a vacuum environment or under the inert gas protection, the raw silicon material used to produce silicon carbide is melted or vaporized in a high temperature environment over 1300° C., and then the melted or vaporized raw silicon material will react with the carbonaceous gas or liquid to form silicon carbide. The present invention uses the carbonaceous gas with no metallic impurities, to replace petroleum coke, resin, asphalt, graphite, carbon fiber, coal, charcoal and some other carbon sources used in current production processes. When the carburizing reaction is in progress, the raw silicon material is melted or vaporized and the reaction takes place in the air. No con- (Continued)

tainer is required, so impurity contamination is lessened, and the produced silicon carbide has a fairly high purity.

15 Claims, 2 Drawing Sheets

(52) U.S. Cl.
CPC .......... *B01J 2219/0869* (2013.01); *B01J 2219/0883* (2013.01); *B01J 2219/0884* (2013.01); *B01J 2219/0886* (2013.01); *B01J 2219/0888* (2013.01); *B01J 2219/0894* (2013.01); *B01J 2219/0898* (2013.01)

(56) References Cited

U.S. PATENT DOCUMENTS

| | | | |
|---|---|---|---|
| 2008/0056977 A1* | 3/2008 | Hung | B01J 19/088 423/291 |
| 2010/0055017 A1 | 3/2010 | Vanier et al. | |
| 2015/0004090 A1* | 1/2015 | Endo | C01B 33/025 423/350 |
| 2016/0376158 A1* | 12/2016 | Tenegal | C09C 1/30 428/404 |
| 2017/0136546 A1* | 5/2017 | Nagai | B01J 19/088 |

* cited by examiner

PRODUCTION PROCESS FOR SILICON CARBIDE

RELATED APPLICATIONS

This application is a national stage entry of International Application No. PCT/CN2015/072942, filed Feb. 12, 2015, and claims benefit of Chinese Patent Application No. CN201410081038.6, filed Mar. 6, 2014.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of the Invention

The invention relates to the technical field of semiconductor production, in particular to a production process for high-purity silicon carbide used as the substrate material of semiconductor devices.

Background of the Invention

The current production process for silicon carbide mixes the silica and the carbon source in proportion, and then heating them with an Acheson furnace. The carbon sources refer to petroleum coke, resin, asphalt, graphite, carbon fiber, coal, charcoal, etc. which contains the carbon element. The silicon dioxide in the silica reacts with the carbon in the carbon source and forms silicon carbide; however, there are lots of metallic impurities in these silica and carbon sources. In a high temperature environment, these impurities also chemically react, affecting the purity of the silicon carbide significantly. The purity of silicon carbide is reduced and it cannot meet the market demand for high-purity silicon carbide. Also, the exhaust produced by the reaction causes serious pollution to the environment. The current production processes have a lot of issues that urgently need resolutions.

In addition, previously, silicon carbide was produced with simple equipment. This kind of simple and outdoor equipment produces plenty of low-purity silicon carbide, tragically pollutes the environment. The cheap silicon carbide does not conform to the environmental regulations, and also can't meet the market demand.

SUMMARY OF THE INVENTION

One object of an embodiment of the present invention is to avoid the issues of the above-mentioned technologies, and to provide a production process for silicon carbide.

A technical issue which one embodiment of the present invention is to provide another production process for silicon carbide, without using carbon sources such as petroleum coke, resin, asphalt, graphite, carbon fiber, coal, charcoal and etc.

Another technical issue which one embodiment of the present invention is to provide a set of equipment for this production process.

An object of one embodiment of the present invention can be achieved by the following technical proposals:

A production process for silicon carbide is characterized in that, in a furnace body, in a vacuum environment or under the inert gas protection, the raw silicon material used to product silicon carbide will be melted or vaporized in a high temperature environment over 1300° C., and the melted or vaporized raw silicon material will react with the carbonaceous gas or liquid to form silicon carbide.

The working principle of one embodiment of the present invention is as follows: the present invention uses the carbonaceous gas and the raw silicon material to react. Since the carbonaceous gas can very high purity, this avoids the effect of the impurities from using carbon sources such as petroleum coke, resin, asphalt, graphite, carbon fiber, coal, charcoal and etc. The raw silicon material can be very high purity as well. On the basis of securing the high purity of these two substances, the raw silicon material is melted or further vaporized in the high temperature environment over 1300° C., and at the same time, the carbonaceous gas or liquid decomposes or splits and releases the carbon element, which reacts with the melted or further vaporized raw silicon material, forming high-purity silicon carbide.

In the production process for silicon carbide, the raw silicon material is silicon element. The silicon element is high-purity metallic silicon, or semiconductor silicon, also known as crystalline silicon.

In the production process for silicon carbide, the raw silicon material is silicon element of a purity higher than 99.99%. The raw silicon material is able to be used if its purity is no less than 99.99%. The semiconductor silicon of such purity is common in the market. No further purification is required, which makes the implementation of the present invention acceptable to the market. The semiconductor-class silicon whose purity is up to 99.9999999999% may be used, if silicon carbide of a higher purity is required.

In the production process for silicon carbide, the place where the raw silicon material reacts with the carbonaceous gas and forms silicon carbide is inside the interior space of the furnace body. The raw silicon material reacts with the carbonaceous gas in the free space of the furnace. This avoids pollution from the containers like the crucible, further reduces the probability of impurity contamination, and improves the purity of the formed silicon carbide.

In the production process for silicon carbide, the raw silicon material is put into the furnace body and gets melted or vaporized, and then it is sprayed into the carbonaceous gas, reacting and forming silicon carbide. Such a process makes the raw silicon material have sufficient energy to fully react, improving the utilization rate of the raw silicon material. Using the spraying method can increase the contact area and distance between the raw silicon material and the carbonaceous gas, and improves the mixing uniformity of them.

In the production process for silicon carbide, the carbonaceous gas or liquid is sprayed into the melted or vaporized raw silicon material, reacting and forming silicon carbide. Other than the carbonaceous gas, high-purity carbonaceous liquid, such as alcohol and ether, may be used as well. The raw silicon material may be put in before the furnace is ignited, and then the raw silicon material melt or vaporize by heating.

In the production process for silicon carbide, the raw silicon material and the carbonaceous gas or liquid are mixed and then put into the furnace body, and the raw silicon material reacts with the carbonaceous gas to form silicon carbide. The raw silicon material may be in powder form, which will be mixed with the gas after being blown by gas or be mixed with the liquid and then the mixture is put into the furnace body. Such a method can accurately control the mix ratio and reduces the exhaust.

In the production process for silicon carbide, the raw silicon material is silicon compounds. Other than using silicon element directly, quartz sand, silica and other compounds containing silicon can be used.

In the production process for silicon carbide, the heat source generator of the high temperature environment, where the raw silicon material is melted or vaporized, is a plasma generator, a combustible gas combustion furnace, a laser, or a graphite electric heater. All of these four devices can provide a temperature higher than 2500° C., meeting the requirement for melting or vaporizing the raw silicon material. At normal temperature and pressure, silicon has a melting point of 1410° C. and a boiling point of 2356° C. However, in the vacuum environment, both of its melting point and boiling point decrease. Whereas the plasma high temperature heat source can produce a high temperature up to 10000° C., far higher than the boiling point of silicon.

In the production process for silicon carbide, the place where the raw silicon material reacts with the carbonaceous gas and forms silicon carbide is located inside a plasma generator, a combustible gas combustion furnace, or a graphite electric heater.

In the production process for silicon carbide, the carbonaceous gas is one of oxocarbons, hydrocarbons, fluorocarbons, chlorocarbons or gas compounds of carbon, hydrogen and fluorine, or a combination of these compounds listed above.

In the production process for silicon carbide, the carbonaceous gas is provided to the silicon carbide production equipment concentric patterns, with the center of the heat source provided by the heat source generator.

In the production process for silicon carbide, the carbonaceous gas will be provided to the production equipment for silicon carbide consisting of several gases of the equivalent composition or of different compositions. The specific means may be one concentric circle providing gases of different compositions, or may be one concentric circle providing only one gas of the equivalent composition, and different concentric circles providing gases of different compositions. In the latter case, gases of different compositions can be provided, based on the radially outward decreasing temperature distribution trend of the heat source, in order to achieve the carburizing reaction of the raw silicon material to the maximum extent, and to form silicon carbide at a high efficiency.

In the production process for silicon carbide, the adjustment of the current velocity of the gases is according to their distance from the center of the heat source. The farther the distance to the center is, the slower gas current velocity is. The closer the distance to the center is, the faster gas current velocity is.

In the production process for silicon carbide, the raw silicon material is mixed with silicon carbide with a weight percentage of 0.1~10%. Adding silicon carbide to the raw silicon material can play the effect to prevent the newly formed silicon carbide from adhering to each other.

A set of production equipment for silicon carbide comprises a furnace body and a crucible inside the furnace body. A lifting base is set at the bottom of the furnace body, and the crucible is placed on the lifting base. It is characterized in that: a heat source generator whose injector is right opposite to the crucible is arranged at the top of the furnace body. Inside the heat source generator, there is an inner cavity connecting to the outlet of the heat source generator. A gas flow guide pipe is designed inside the inner cavity, and several annular partition plates concentric with the gas flow guide pipe are installed on the heat source generator, forming several concentric outlets at the outlet of the heat source generator. On the heat source generator, there are also inlets connecting to respective outlets. Exhaust ports are designed on the bottom of the furnace body.

The working principle of the production equipment for silicon carbide is as following: the heat source generator is a plasma generator or a laser generator. When argon gas is filled into the gas flow guide pipe of the plasma generator or laser generator, plasma flame or laser arises at the outlet. The plasma generator or laser generator forms several concentric outlets through the partition plate. Since the gas flow guide pipe is the axis line, the plasma flame or laser are at the center of the several concentric outlets. The carbonaceous gas can be filled through the inlet in advance and the supply is maintained. The particles of the raw silicon material can be added into the inlet or the gas flow guide pipe. They will be melted or further vaporized and react with the carbonaceous gas in the concentric circle areas, forming high-purity silicon carbide, which then falls into the crucible.

In the production equipment for silicon carbide, the inlet connecting to the inner cavity is the raw silicon material Inlet.

In the production equipment for silicon carbide, there are two partition plates successively sleeved over the outside of the wall of the inner cavity, forming the carbonaceous gas inlet and the auxiliary inlet, respectively. The auxiliary inlet can be used as the inlet of the carbonaceous gas or the protective gas.

In the production equipment for silicon carbide, the suction ports are designed on the external side wall of the crucible, to suck the formed silicon carbide into the crucible. The suction ports connect to an external vacuum pump through a pipe.

In the production equipment for silicon carbide, the protective gas inlets are arranged on the top of the furnace body.

Compared to the prior art, the present invention uses the carbonaceous gas with no metallic impurities to replace petroleum coke, resin, asphalt, graphite, carbon fiber, coal, charcoal and some other carbon sources used in current production processes. The purity of gas can be up to 99.99999% or even higher, namely, 7-nines, and the purity of the silicon or raw silicon material can be of more than 12-nines. When the carburizing reaction is in progress, the raw silicon material is melted or vaporized and the reaction takes places in the free space. Therefore, no container is required, impurity contamination is lessened, and the produced silicon carbide has a fairly high purity, up to 99.9999%. Such a production process does not produce metallic ash content, avoids pollutions to the environment and has a bright market prospect.

DETAILED DESCRIPTION OF THE INVENTION

The embodiments of this invention will be described below and the technical solutions of the invention will be further illustrated in connection with the accompanying figures. However, the present invention shall not be limited to these embodiments.

First Embodiment

Figure 1:
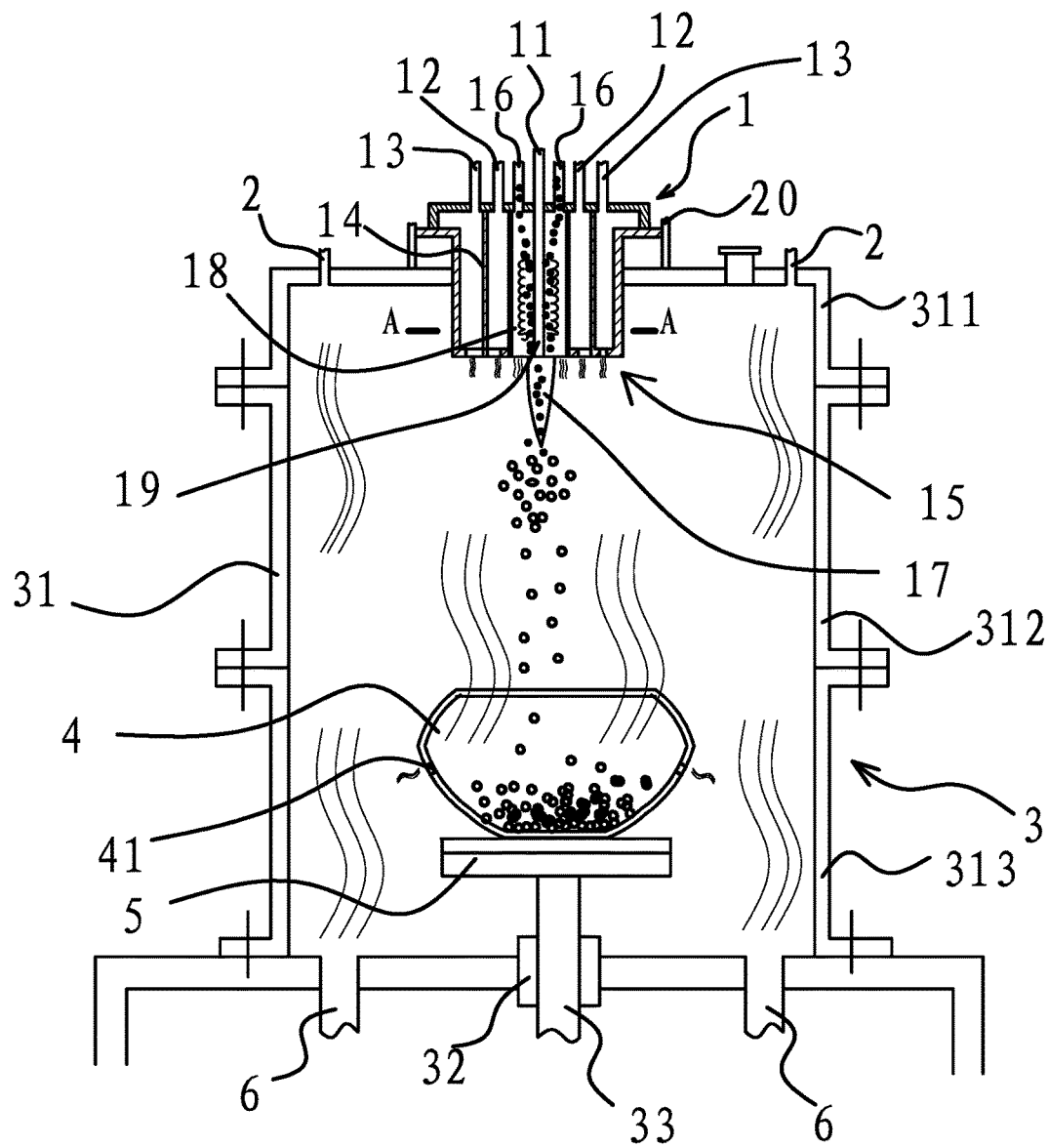
FIG. 1 is a schematic view of one embodiment of the present production equipment for silicon carbide.

The present production process for silicon carbide is achieved by the production equipment shown in FIG. 1. FIG. 1 shows a reacting furnace to produce silicon carbide. Inside the furnace body under the inert argon gas protection, the raw silicon material used to produce silicon carbide is melted or vaporized in a high temperature environment over 1300° C., and then the melted or vaporized raw silicon material will react with the carbonaceous gas or liquid to form silicon carbide. The specific processes are as following:

A. Connecting the Production Equipment and Setting its Parameters:

Connect the argon gas source that generates plasma to the gas pipe inlet (11) of the plasma generator (1). The gas pipe inlet (11) is also the electrode terminal of the plasma generator. Regulate the flow rate of argon gas to 10~30 L/min. In this embodiment, 20 L/min is set. Connect the plasma generator (1) to the power source and set the electrical current of the plasma to 200 A, and the arc ignition voltage to 20000V. Connect the source of the carbonaceous gas to the carbonaceous gas inlet (12) and the auxiliary inlet (13). The flow rate of the carbonaceous gas shall be adjusted within the range of 0.3~30 L/min, according to the stage of the process. The flow rate of the carbonaceous gas in the auxiliary inlet (13) shall be adjusted within the range of 0.5~50 L/min. Such gas not only provides the carbon element, but also can be used as the protective gas. Connect the source of the protective argon gas to the protective gas inlet (2), and maintain the flow rate of the argon gas in the reacting furnace (3) within the range of 10~30 L/min. In this embodiment, 20 L/min is set. The concentric outlet (15) of the plasma generator (1) formed by the partition plates (14) comprises the raw silicon material outlet (151), the carbonaceous gas outlet (152) and the auxiliary outlet (153). In order to ensure that the raw silicon material and the carbonaceous gas fully react, the diameter of the raw silicon material outlet (151) is 10~20 mm. In this embodiment, it is 15 mm. The diameter of the carbonaceous gas outlet (152) is 45~55 mm. In this embodiment, it is 50 mm. The diameter of the auxiliary outlet (153) is 5~15 mm. In this embodiment, it is 10 mm. The diameter of the lifting base (5) below the crucible (4) is 200 mm.

B. Adding the Raw Silicon Material:

After step A, use high-purity metallic silicon of the diameter below 1 mm as the raw silicon material. The purity of the raw silicon material is higher than 99.99%. Add the raw silicon material into the raw silicon material inlet (16) at the rate of 10 g/min. The raw silicon material is silicon element. Other than silicon element, silicon compounds such as silica and quartz sand can be used substitutively. The input amount of the raw silicon material refers to the amount, at which the plasma flame (17) generated by the plasma generator (1) can fully melt or vaporize the raw silicon material. It does not relate to the size of the raw material. The flow rate of the carbonaceous gas refers to the flow rate, at which, when the carbonaceous gas is mixed with the raw silicon material, the carbon element contained in the compositions of the carbonaceous gas is sufficient to carburize the raw silicon material. The protective gas in the auxiliary inlet (13) refers to the gas, which is used to suppress the diffusion of the carbonaceous gas, in order to make the raw materials fully react at high efficiency.

Figure 3:
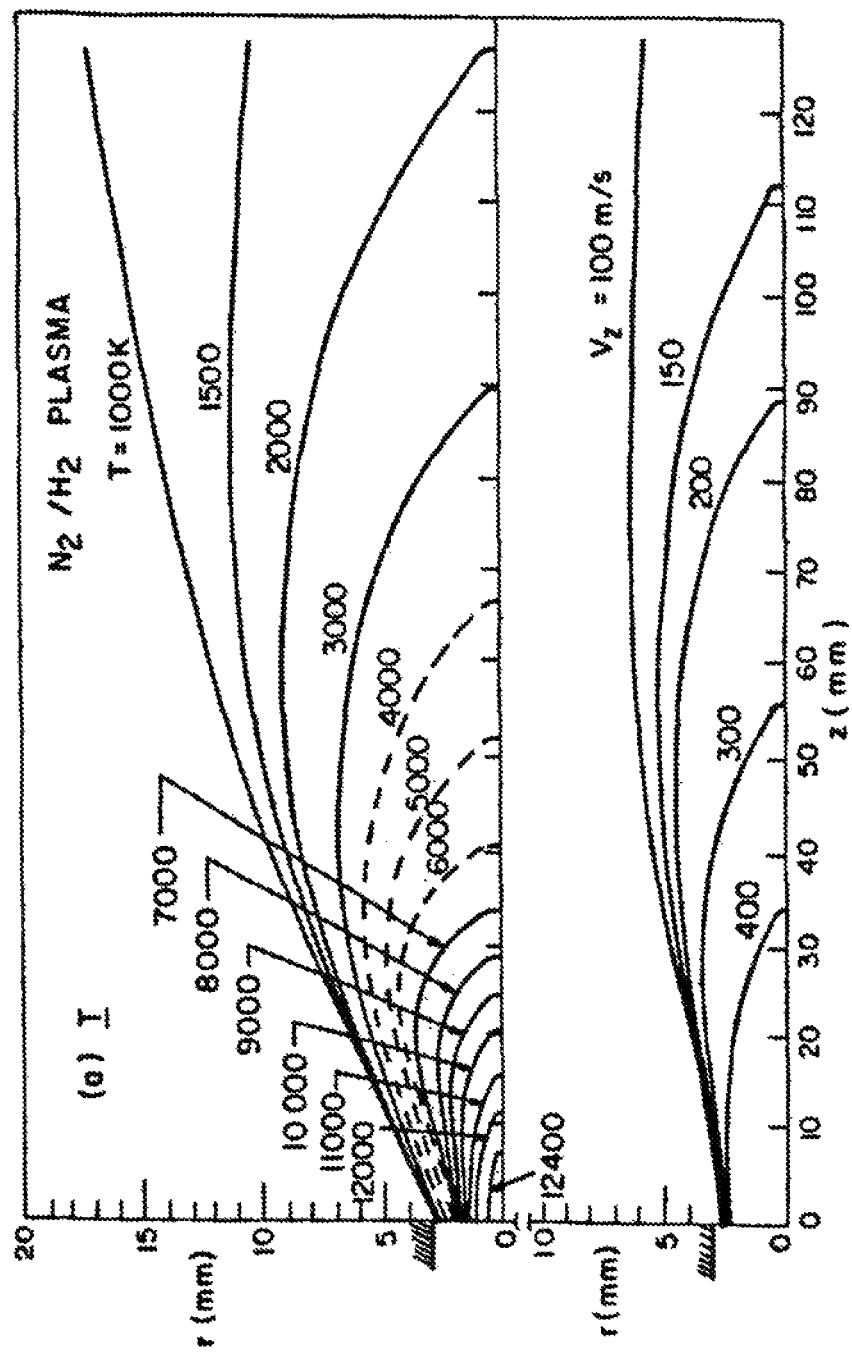
FIG. 3 is a chart relating to the temperature and current velocity distribution of the plasma flame for setting parameters in the first embodiment.

In the high temperature environment produced by the plasma flame (17), the temperature of the plasma flame (17) is shown in FIG. 3. The closer the distance to the outlet is, the higher the temperature is. The highest temperature is 12000° C., and the temperature gradually decreases outwards. Also, from the axis representing the spray velocity, it can be presumed that the velocity at the center of the flame is 400 m/s, and the velocity gets slower when the flame goes farther way from the center. Therefore, when the raw silicon material falls into the plasma flame (17), it is descending from a position having a 12000° C. temperature. During the fall, the raw silicon material gets melted or further vaporized, and is sprayed with the flame, so the melted or vaporized raw silicon material is provided to the carbonaceous gas which is filled in advance. In this embodiment, it may be filled through the carbonaceous gas outlet (152) or the auxiliary outlet (153). Therefore, the reaction takes place inside the interior space of the furnace body, which reduces the probability of impurity contamination, and the formed silicon carbide will fall into the crucible below. The place where the reaction takes place can also be set inside the plasma generator, namely, in the cavity above the outlet of the flame. Setting the reaction inside the cavity can further reduce the impurity contamination, and the silicon carbide has an effect of thermal disturbance after it falls into the furnace body. Spraying the raw silicon material into the carbonaceous gas can ensure there is enough carbon element for the raw silicon material to fully react. In addition, using the spraying method can increase the contact of the raw silicon material and the carbonaceous gas, and improves the mixing uniformity of them. Other than the plasma generator (1) used in this embodiment, a combustible gas combustion furnace, a laser furnace, or a graphite electric heater can also be used substitutively.

The carbonaceous gas is one of oxocarbons, hydrocarbons, fluorocarbons, chlorocarbons or gas compounds of carbon, hydrogen and fluorine, or a combination of these compounds listed above. Specifically, the oxocarbons may be CO and $CO_2$, the hydrocarbons may be gases like $CH_4$, $C_2H_2$, $C_3H_6$, etc., the fluorocarbons may be gases like $CF_4$, $C_2F_4$, $C_3F_6$, etc., the chlorocarbons may be gases like $CCl_4$, $C_2Cl_2$, $C_3Cl_6$, etc. and gas compounds of carbon, hydrogen and fluorine, such as $CH_2F_2$, etc. are also acceptable. A mixture of these gases at some ratio is also acceptable, as long as the carbon element contained in the compositions of the carbonaceous gas is sufficient to carburize the raw silicon material. Other than the gases, liquids containing carbon element, such as alcohol, ether, etc. can also be used. The added amount shall be sufficient for the carbon element contained therein to carburize the raw silicon material.

When the carbonaceous gas is filled, the carbonaceous gas is provided to the production equipment for silicon carbide, namely, the reacting furnace (3), through concentric patterns, with the center at the heat source provided by the heat source generators. In this embodiment, the heat source is the plasma flame (17). The carbonaceous gas provided to the production equipment for silicon carbide consists of several gases of different compositions. Specifically, within each concentric circle, gases of different compositions are provided. The current velocity of the gases is adjusted according to their distance from the center of the heat source. The carbonaceous gas may also consist of only one and the equivalent composition.

In order to prevent the newly formed silicon carbide from adhering to each other, silicon carbide with a weight percentage of 0.1~10% is added into the raw silicon material. Besides, whatever the size of the raw silicon material is, even if it is at nanoscale, adding silicon carbide whose size is 10 or more times as large as that of the raw silicon material can make the reaction products sprayed out smoothly without adhering to each other. An addition of silicon carbide with a weight percentage of 1~5% is preferred.

Furthermore, when the size of the raw silicon material is within the range, the gas will not fully react if any flow rate of the gases above is below the range stated above. Redundancy and waste will arise if any flow rate of the gases above is beyond the range stated above.

To further improve the purity and avoid secondary pollution, the inner side of the furnace body (31) is polished or coated. The coating is a polymer PTFE coating. In addition, the flow rate of the protective gas is set as over 2 times as high as that of the carbonaceous gas.

The working principle of the present invention is as following: The raw silicon material falls into the plasma flame (17), gets melted or further vaporized in the plasma flame (17); and is sprayed with the plasma flame (17) into the carbonaceous gas. In the plasma flame (17), the carbonaceous gas decomposes and releases carbon element. The carbon element reacts with the melted or vaporized raw silicon material, and hence forms silicon carbide. High-purity silicon carbide can be obtained by collecting the formed silicon carbide. Since the carbonaceous gas has a high purity and does not contain metallic impurities, high-purity silicon carbide can be obtained, and no air pollution of metallic ash will be caused because there are no metallic impurities.

As shown in the table below, it is a table of content analysis of semiconductor silicon. An experiment is carried out with high-purity silicon as the raw material, following the process conditions above, and silicon carbide is obtained. After eliminating the effect on the impurities resulting from Tantalum (Ta) silicon carbide of a purity of 99.9995% is obtained according to the analysis.

| Element | Concentration [ppm wt] | Element | Concentration [ppm wt] |
|---|---|---|---|
| Li | <0.01 | Pd | <0.1 |
| Be | <0.01 | Ag | <0.5 |
| B | <0.01 | Cd | <0.1 |
| C | — | In | Binder |
| N | — | Sn | <0.5 |
| O | — | Sb | <0.1 |
| F | <1 | Te | <0.1 |
| Na | 0.05 | I | <0.5 |
| Mg | <0.05 | Cs | <1 |
| Al | <0.05 | Ba | <0.05 |
| Si | Matrix | La | <0.1 |
| P | <0.01 | Ce | <0.05 |
| S | 0.42 | Pr | <0.05 |
| Cl | ~0.5 | Nd | <0.05 |
| K | <0.05 | Sm | <0.05 |
| Ca | <0.5 | Eu | <0.05 |
| Sc | <0.05 | Gd | <0.05 |
| Ti | <0.01 | Tb | <0.05 |
| V | <0.01 | Dy | <0.05 |
| Cr | <0.1 | Ho | <0.05 |
| Mn | <0.01 | Er | <0.05 |
| Fe | <0.05 | Tm | <0.05 |
| Co | <0.01 | Yb | <0.05 |
| Ni | <0.01 | Lu | <0.05 |
| Cu | <0.05 | Hf | <0.05 |
| Zn | <0.1 | Ta | <50 |
| Ga | <0.1 | W | <0.05 |
| Ge | <0.5 | Re | <0.01 |
| As | <0.05 | Os | <0.01 |
| Se | <1 | Ir | <0.01 |
| Br | <0.1 | Pt | <0.1 |
| Rb | <0.05 | Au | <0.1 |
| Sr | <0.05 | Hg | <0.1 |
| Y | <0.05 | Tl | <0.05 |
| Zr | <0.05 | Pb | <0.1 |
| Nb | <0.05 | Bi | <0.05 |
| Mo | <0.05 | Th | <0.01 |
| Ru | <0.05 | U | <0.01 |
| Rh | <0.1 | | |

An experiment using C2H2 as the carbonaceous gas, following the process conditions stated above, is carried out, and silicon carbide of a purity of 99.9999% is obtained. The results of the experiments can prove that, the present invention is a high effective production process to produce high-purity silicon carbide.

The production equipment of the production process for silicon carbide is as shown in FIG. 1. It comprises a furnace body (31) and a crucible (4) inside the furnace body (31). A lifting base (5) is set at the bottom of the furnace body (31), and the crucible (4) is placed on the lifting base (5). A plasma generator (1) whose injector is right opposite to the crucible (4) is arranged at the top of the furnace body (31). The plasma flame (17) generated by the plasma generator (1) is used to produce silicon carbide. Specifically, The furnace body (31) is divided into three parts: the upper part (311), the middle part (312) and the lower part (313). The upper part (311) and the upper end of the middle part (312) are connected by a flange, and the lower end of the middle part (312) and the lower part (313) are connected by a flange, so an enclosed space is formed. A sliding bearing (32) is arranged on the lower part (313), and a drive rod (33) is installed on the sliding bearing (32). One end of the drive rod (33) stretches into the furnace body (31) and the lifting base (5) is arranged on the end. The crucible (4) is placed on the lifting base (5). By this way, the position of the crucible (4) can be adjusted according to the spraying range of the silicon carbide and the temperature of the plasma flame (17). The crucible (4) has a structure with a small mouth and a big interior space. Suction ports (41) are designed on its external side wall, to suck the formed silicon carbide into the crucible (4). The suction ports (41) are arranged at the lower half part of the side wall of the crucible (4) and inclined downward. The suction ports (41) connect to an external vacuum pump through the pipe. Exhaust ports (6) are designed on the bottom of the furnace body (31).

Figure 2:
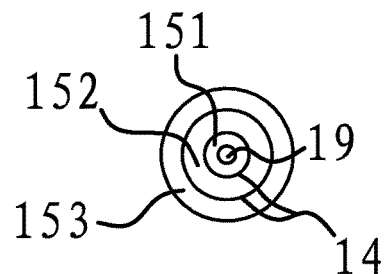
FIG. 2 is the A-A sectional view of FIG. 1.

A plasma generator (1) is arranged on the upper part (311). Inside the plasma generator (1), there is an inner cavity (18) connecting to the outlet of the plasma generator (1). A gas flow guide pipe (19) is designed inside the inner cavity (18), and the gas flow guide pipe (19) is at the center. Several annular partition plates (14) concentric with the gas flow guide pipe (19) are installed on the plasma generator (1), forming several concentric outlets (15) at the outlet of the plasma generator (1). As shown in FIG. 2, in the plasma generator (1), there are also inlets connecting to respective outlets. The inlet connecting to the inner cavity (18) is the raw silicon material Inlet (16). There are two partition plates (14) successively sleeved over the outside of the wall of the inner cavity (18), forming the carbonaceous gas inlet (12) and the auxiliary inlet (13) respectively. The concentric outlet (15) of the plasma generator (1) formed by the partition plates (14) comprises the raw silicon material outlet (151), the carbonaceous gas outlet (152) and the auxiliary outlet (153). On the side of the plasma generator (1), there is a coolant water inlet & outlet (20), and the coolant water inlet & outlet (20) is also an electrode terminal of the plasma generator.

There is a top part on the upper part (311), and a protective gas inlet (2) is designed on the top part. The protective gas inlet (2) is near the inner side wall of the furnace body (31). An observation window to observe the interior situation of the furnace body (31) is arranged on the top part as well.

The working principle of the production equipment for silicon carbide is as follows: When argon is filled into the gas flow guide pipe (19) of the plasma generator, plasma flame (17) arises at the outlet. The plasma generator (1) forms several concentric outlets (15) through the partition plates (14). Since the gas flow guide pipe (19) serves as the axis line, the plasma flame (17) is at the center of the several concentric outlets (15). The carbonaceous gas can be filled through the inlet in advance and the supply is maintained. The particles of the raw silicon material can be added into the inlet or the gas flow guide pipe (19). Falling into the plasma flame (17), they will be melted or further vaporized and react with the carbonaceous gas in the concentric circle areas, forming high-purity silicon carbide, which then falls into the crucible (4).

Second Embodiment

The composition of the Second Embodiment is largely the same as the First Embodiment. The differences are:

The silicon ingot is put into the furnace before igniting and heating, and then it is melted or vaporized inside the furnace when the furnace is ignited. In the high temperature environment, the carbonaceous gas or liquid are provided to the melted or vaporized raw silicon material, reacts and forms silicon carbide. The working principle is that:

The raw silicon material gets melted or further vaporized in the high temperature environment. At the same time, the carbonaceous gas in the high temperature environment decomposes or splits and releases carbon element, and it is sprayed to the melted or further vaporized raw silicon material.

Third Embodiment

The composition of the Third Embodiment is largely the same as the First Embodiment. The differences are:

The raw silicon material may be in powder form, which, after being blown by gas, is mixed with the gas or is mixed with the liquid and the mixture is put into the furnace body. In a high temperature environment over 1300° C., the raw material for the reaction which is mixed with the raw silicon material and the carbonaceous gas or liquid, is put into the furnace body. The reaction is that, in a vacuum environment, or in an environment of the protective argon gas, the raw silicon material and the carbonaceous gas react to form silicon carbide. This process can accurately control the mix ratio, and reduces the exhaust.

Fourth Embodiment

The Fourth Embodiment is largely the same as the First Embodiment or the Second Embodiment. The differences are: the reaction takes place in a vacuum environment in this embodiment. At normal temperature and pressure, silicon has a melting point of 1410° C. and a boiling point of 2356° C. However, in the vacuum environment, both of its melting point and boiling point decrease. Whereas the plasma high temperature heat source can produce a high temperature up to 10000° C., far higher than the boiling point of silicon.

Fifth Embodiment

The Fifth Embodiment is largely the same as the First Embodiment, the Second Embodiment, the Third Embodiment, or the Fourth Embodiment. The differences are:

The heat source generator may be a combustible gas combustion furnace, a laser furnace, or a graphite electric heater. The place where the raw silicon material reacts with the carbonaceous gas and forms silicon carbide is located inside a combustible gas combustion furnace, or a graphite electric heater.

The description of the preferred embodiments thereof serves only as an illustration of the spirit of the invention. It will be understood by those skilled in the art that various changes or supplements in form and details may be made therein without departing from the spirit and scope of the invention as defined by the appended claims.

LIST OF REFERENCE NUMERALS

1 Plasma Generator
11 Gas Pipe Inlet
12 Carbonaceous Gas Inlet
13 Auxiliary Inlet
14 Partition Plate
15 Concentric Outlet
151 Raw Silicon Material Outlet
152 Carbonaceous Gas Outlet
153 Auxiliary Outlet
16 Raw Silicon Material Inlet
17 Plasma Flame
18 Inner Cavity
19 Gas Flow Guide Pipe
20 Coolant Water Inlet & Outlet
2 Protective Gas Inlet
3 Reacting Furnace
31 Furnace Body
311 Upper Part
312 Middle Part
313 Lower Part
32 Sliding Bearing
33 Drive Rod
4 Crucible
41 Suction Port
5 Lifting Base
6 Exhaust Port

What is claimed is:

1. A production process for silicon carbide comprising the steps of:
   feeding raw carbonaceous gas or liquid into a furnace body and adding raw silicon material particles into the furnace body at an upper part of the furnace body;
   melting or vaporizing raw silicon material in an environment at a high temperature over 1300° C., the melting or vaporizing step occurring in the furnace body, in a vacuum environment, or under inert gas protection; and
   having the melted or vaporized raw silicon material react with raw carbonaceous gas or liquid to form silicon carbide particles and the silicon carbide particles drop downwards freely to a bottom of the furnace body.

2. The production process for silicon carbide as claimed in claim 1 wherein the raw silicon material is silicon element.

3. The production process for silicon carbide as claimed in claim 2 wherein the raw silicon material is silicon element of purity higher than 99.99%.

4. The production process for silicon carbide as claimed in claim 1 wherein a place where the raw silicon material reacts with the carbonaceous gas and forms silicon carbide is inside an interior space of the furnace body.

5. The production process for silicon carbide as claimed in claim 1 wherein the raw silicon material is put into the furnace body and gets melted or vaporized, and then the raw silicon material is sprayed into the carbonaceous gas, reacting and forming silicon carbide.

6. The production process for silicon carbide as claimed in claim 1 wherein the carbonaceous gas or liquid is sprayed into the melted or vaporized raw silicon material, reacting and forming silicon carbide.

7. The production process for silicon carbide as claimed in claim 1 wherein the raw silicon material and the carbonaceous gas or liquid are mixed and then put into the furnace body, and the raw silicon material reacts with the carbonaceous gas to form silicon carbide directly.

8. The production process for silicon carbide as claimed in claim 1 wherein the raw silicon material is silicon compounds.

9. The production process for silicon carbide as claimed in claim 1 wherein a heat source generator of the high temperature environment, where the raw silicon material is melted or vaporized, is a plasma generator, a combustible gas combustion furnace, a laser furnace, or a graphite electric heater.

10. The production process for silicon carbide as claimed in claim 9 wherein a place where the raw silicon material reacts with the carbonaceous gas and forms silicon carbide is located inside a plasma generator, a combustible gas combustion furnace, or a graphite electric heater.

11. The production process for silicon carbide as claimed in claim 9 wherein the carbonaceous gas is provided to production equipment for silicon carbide through concentric patterns, with a center at a heat source provided by the heat source generator.

12. The production process for silicon carbide as claimed in claim 11 wherein the carbonaceous gas provided to the production equipment for silicon carbide consists of several gases of equivalent compositions or different compositions.

13. The production process for silicon carbide as claimed in claim 12 wherein a current velocity of the gases is adjusted according to a distance of the gases from the center of the heat source.

14. The production process for silicon carbide as claimed in claim 1 wherein the carbonaceous gas is one compound from the group consisting of oxocarbons, hydrocarbons, fluorocarbons, chlorocarbons, or gas compounds of carbon, hydrogen, and fluorine, or a combination of the compounds.

15. The production process for silicon carbide as claimed in claim 1 wherein raw silicon material is mixed with silicon carbide with a weight percentage of 0.1% to 10%.

* * * * *